United States Patent
Oyama

(10) Patent No.: US 7,787,161 B2
(45) Date of Patent: Aug. 31, 2010

(54) IMAGE READING DEVICE AND IMAGE FORMING APPARATUS

(75) Inventor: Kiyoshi Oyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 912 days.

(21) Appl. No.: 11/612,944

(22) Filed: Dec. 19, 2006

(65) Prior Publication Data

US 2007/0146822 A1    Jun. 28, 2007

(30) Foreign Application Priority Data

Dec. 27, 2005    (JP)    ............................ 2005-376413

(51) Int. Cl.
H04N 1/04    (2006.01)
(52) U.S. Cl. ...................... 358/498; 358/474; 358/486; 358/496
(58) Field of Classification Search ................. 358/498, 358/474, 486, 496
See application file for complete search history.

(56) References Cited

U.S. PATENT DOCUMENTS

| | | | | |
|---|---|---|---|---|
| 4,959,536 | A * | 9/1990 | Ijuin et al. .................. | 250/216 |
| 4,975,787 | A * | 12/1990 | Ijuin et al. .................. | 358/461 |
| 5,477,047 | A * | 12/1995 | Nakagawa et al. ....... | 250/208.1 |
| 5,805,309 | A * | 9/1998 | Hwang ....................... | 358/496 |
| 5,943,451 | A * | 8/1999 | Lee ............................. | 382/313 |
| 5,956,161 | A * | 9/1999 | Takashimizu et al. ...... | 358/496 |
| 5,991,467 | A * | 11/1999 | Kamiko ..................... | 382/312 |
| 6,901,237 | B2 * | 5/2005 | Nakamura .................. | 399/367 |
| 2001/0033398 | A1 * | 10/2001 | Chen .......................... | 358/498 |
| 2001/0033761 | A1 * | 10/2001 | Takida et al. ............... | 399/367 |
| 2003/0072041 | A1 * | 4/2003 | Sawada ...................... | 358/494 |
| 2003/0137703 | A1 * | 7/2003 | Aoki et al. .................. | 358/498 |
| 2003/0227125 | A1 * | 12/2003 | Nakamura ................. | 271/10.11 |
| 2004/0081495 | A1 * | 4/2004 | Nakamura .................. | 399/367 |
| 2005/0094225 | A1 * | 5/2005 | Hu .............................. | 358/493 |
| 2005/0134943 | A1 * | 6/2005 | Baba et al. .................. | 358/487 |
| 2005/0163546 | A1 * | 7/2005 | Kim ............................ | 399/367 |
| 2005/0206968 | A1 * | 9/2005 | Sodeura et al. ............. | 358/474 |

(Continued)

FOREIGN PATENT DOCUMENTS

JP    06156789 A  *  6/1994

(Continued)

Primary Examiner—King Y Poon
Assistant Examiner—Kenneth Kwan
(74) Attorney, Agent, or Firm—Rossi, Kimms & McDowell LLP

(57) ABSTRACT

An image reading device which is capable of reading out image data on an original while conveying the original in a simple construction. A conveying path has a pair of guide members facing each other at a distance and extending in a conveying direction of an original. An original conveying unit conveys the original along the conveyance path. An image reading unit is comprised of a flexible sheet-like substrate on which a plurality of optical sensors are arranged. The sheet-like substrate is inclined with respect to the conveying direction of the original, and fixed to one of the pair of guide members at one end thereof and abuts against the other of the pair of guide members at the other end thereof. The image reading unit reads image data on one side of the original when the original is conveyed along the conveying path and passes through between the other end of the sheet-like substrate and the other of the pair of guide members.

11 Claims, 5 Drawing Sheets

U.S. PATENT DOCUMENTS

| | | | |
|---|---|---|---|
| 2005/0213167 A1* | 9/2005 | Shiraishi | 358/474 |
| 2007/0091389 A1* | 4/2007 | Kakuta | 358/498 |
| 2008/0030809 A1* | 2/2008 | Itabashi et al. | 358/498 |

FOREIGN PATENT DOCUMENTS

| | | | | |
|---|---|---|---|---|
| JP | 07-110641 A | | | 4/1995 |
| JP | 09198469 A | * | | 7/1997 |
| JP | 09247395 A | * | | 9/1997 |
| JP | 2000085992 A | * | | 3/2000 |
| JP | 2000115452 A | * | | 4/2000 |
| JP | 2000309450 A | * | | 11/2000 |
| JP | 2002111974 A | * | | 4/2002 |
| JP | 2003051915 A | * | | 2/2003 |
| JP | 2003125168 A | * | | 4/2003 |
| JP | 2003146480 A | * | | 5/2003 |
| JP | 2003182888 A | * | | 7/2003 |
| JP | 2004007239 A | * | | 1/2004 |
| JP | 2004061978 A | * | | 2/2004 |
| JP | 2004215299 A | * | | 7/2004 |
| JP | 2004349911 A | * | 12/2004 |
| JP | 2005039843 A | * | | 2/2005 |
| JP | 2006145947 A | * | | 6/2006 |
| WO | WO 2005051664 A2 | * | | 6/2005 |

* cited by examiner

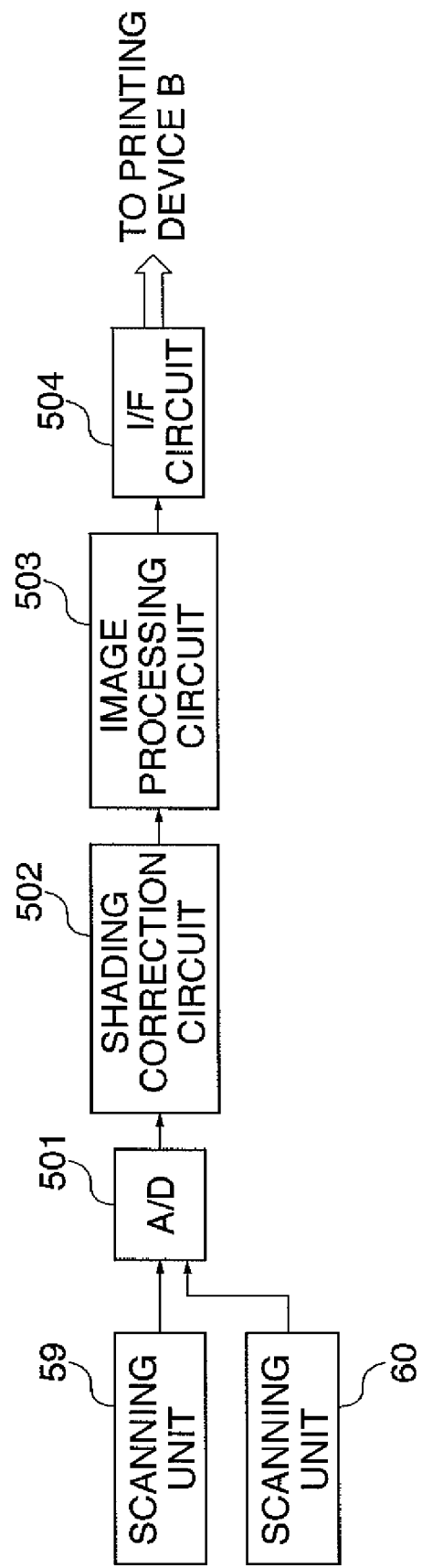

IMAGE READING DEVICE AND IMAGE FORMING APPARATUS

BACKGROUND OF THE INVENTION

1. Field of the Invention

The present invention relates to an image reading device which reads image data on an original while conveying the original, and an image forming apparatus including the reading device.

2. Description of Related Art

Conventionally, an image forming apparatus such as a copy machine includes an image reading device. There has been proposed an image reading device which is capable of reading with a scanning unit staying at a predetermined position while conveying an original fed from an automatic original feeder in the sub scanning direction, and another image reading device which is capable of reading double sides of an original (see e.g. Japanese Laid-Open Patent Publication (Kokai) No. H07-110641).

An image forming apparatus including an image reading device which is capable of reading double sides of an original will now be described with reference to FIG. 5. FIG. 5 is a longitudinal sectional view of an image forming apparatus including a conventional image reading device.

As shown in FIG. 5, the image forming apparatus is provided with an image reading device A that reads image data on an original, and a printing device B that forms the image data read by the image reading device A on a sheet of paper.

The image reading device A is comprised of an auto document feeder (hereinafter referred to "the ADF") 2 and a scanning device 1. The ADF 2 has an original tray 12, a pick-up roller 43, pairs of separating rollers 44a, 44b, a plurality of conveying rollers 46, 48, discharge rollers 49, and a discharge tray 50. Originals D are stacked on an original tray 12. The originals D stacked on the original tray 12 are separated one by one by the pick-up roller 43 and a pair of the separating rollers 44a, 44b, and conveyed onto a conveying path 156. The original D is conveyed along the conveyance roller 156, and the image on the original D is read by the scanning device 1. The original D is, after the image on the original is read, discharged onto the discharge tray 50 by the conveying rollers 48 and the discharge rollers 49.

An inversion flapper 152 is disposed at a portion downstream of the conveying rollers 48 so as to enable the double sides of the original D to be read. An inversion conveying path 153 is also provided to invert a surface of the original D to be read.

The scanning device 1 has a platen glass 22 and a scanning unit 21 disposed below the platen glass 22. The scanning unit 21 is adapted to move in the direction of an arrow F (the sub scanning direction) in the FIG. 5 being guided by a guide rail 24. The scanning unit 21 is provided with a plurality of lamps 21c which illuminate the original D, a line CCD (Charge Coupled Device) 21g, and an optical system 21f that guides the reflected light from the original illuminated by the respective lamps 21c.

The image reading device A has two modes; a moving original reading mode and a fixed original reading mode. Reading can be performed in each mode.

In the moving original reading mode, the original D fed from the ADF 2 is read by the scanning unit 21 while being conveyed in the sub scanning direction. Specifically, the original D is fed from the ADF 2, and conveyed in the sub scanning direction. In this case, the scanning unit 21 stays at a moving original reading position 101 facing a moving original reading position 102. When the original D being conveyed in the sub scanning direction passes through the moving original reading position 101, reading of the original D in the main scanning direction is performed by the scanning unit 21, which enables the whole surface of one side of the original D to be read. The original D is discharged onto the discharge tray 50 by the conveying rollers 48 and the discharge rollers 49. Reading one side of the original D is thus performed.

In the moving original reading mode, when the double-sided reading mode is selected, the original D is pulled out of the device by the discharge rollers 49 until its rear part passes through the inversion flapper 152 after one side of the original D is read. Next, when the inversion flapper is switched over, the discharge rollers 49 are rotated in the opposite direction, which causes the original D to be guided to the inversion conveying path 153, with the surface of the original D to be read being inverted. The original D is conveyed again towards the moving original position 101 by the conveyance rollers 46 and the other side of the original D is read by the scanning unit 21. Reading double sides of the original D is thus performed.

On the other hand, in the fixed original reading mode, the original D is placed at a predetermined position on the platen glass 22, and the scanning unit 21 is moved in the sub scanning direction to the placed original D. Namely, the scanning unit 21 is moved in the sub scanning direction relative to the original D on the platen glass 22 while reading the original D in the main scanning direction. Reading the whole of the original is thus performed.

The printing device B has a laser unit 3. The laser unit 3 modulates a laser beam based on the image data (a video signal) read by the image reading device A, and then irradiates the laser beam onto a photosensitive drum 10, thereby allowing an electrostatic latent image to be formed on the photosensitive drum 10. The electrostatic latent image formed on the photosensitive drum 10 is visualized as a toner image with toner provided by a developing unit 11. The toner image is transferred on a sheet P fed via registration rollers 5 from a sheet feeding cassette 4, by a transfer unit 6. The sheet P on which the toner image is transferred is conveyed to a fixing unit 7. This fixing unit 7 fixes the toner image on the sheet P by applying thermal pressure to the sheet P. The sheet P on which the toner image is fixed is discharged onto a discharge tray 9 via discharge rollers 8.

However, since the conventional image reading device A includes the scanning unit 21 mounting the line CCD, the optical system and the like, the construction to realize the moving original reading mode is complicated, thereby making it difficult to realize cost-reduction and miniaturization of the device.

Further, since the inversion flapper 152 to invert the original, the inversion conveying path 153 and the like are needed to realize double-sided reading of the original, the apparatus becomes big and the cost gets high, thereby making it difficult to realize cost-reduction and miniaturization of the device.

SUMMARY OF THE INVENTION

It is an object of the present invention to provide an image reading device which is capable of reading out image data on an original while conveying the original in a simple construction, and an image forming apparatus including the reading device.

To attain the above object, in a first aspect of the present invention, there is provided an image reading device comprising: a conveying path that has a pair of guide members facing each other at a distance and extending in a conveying direction of an original; an original conveying unit that conveys the original along the conveyance path; and an image reading unit that is comprised of a flexible sheet-like substrate on which a plurality of optical sensors are arranged, wherein the sheet-like substrate is inclined with respect to the conveying direction of the original, and fixed to one of the pair of guide members at one end thereof and abuts against the other of the pair of guide members at the other end thereof, and the image reading unit reads image data on one side of the original when the original is conveyed along the conveying path and passes through between the other end of the sheet-like substrate and the other of the pair of guide members.

Preferably, the image reading unit is comprised of another flexible sheet-like substrate on which a plurality of optical sensors are arranged, the another sheet-like substrate is inclined with respect to the conveying direction of the original, and fixed to the other of the pair of guide members ate one end thereof and abuts against the one of the pair of guide members at the other end thereof, and the image reading unit reads out image data on the other side of the original when the original is conveyed along the conveying path and passes through between the other end of the another sheet-like substrate and the one of the pair of guide members.

Preferably, the plurality of optical sensors are arranged on the sheet-like substrate in the form of a matrix.

Preferably, the plurality of optical sensors are in the form of an arrangement pattern in which the respective optical sensors are arranged along the conveying direction of the original and a direction perpendicular to the conveying direction of the original, respectively.

Preferably, the other of the pair of guide members has a reference member for obtaining shading data in the vicinity of its portion against which an end of the sheet-like substrate abuts.

Preferably, the sheet-like substrate is optically transparent, and a light source for illuminating the original via the substrate is arranged at a rear side of the sheet-like substrate.

To attain the above object, in a second aspect of the present invention, there is provided an image forming apparatus including an image reading device described above.

According to the present invention, it is possible to read out image data on an original while conveying the original in a simple construction.

Other features and advantages of the present invention will be apparent from the following description taken in conjunction with the accompanying drawings, in which the identical reference signs designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

FIG. 4 is a block diagram of a circuit configuration of an image processing unit in FIG. 3A.

DETAILED DESCRIPTION OF THE PREFERRED EMBODIMENTS

A preferred embodiment of the present invention will be described in detail below with reference to the drawings.

Figure 1:
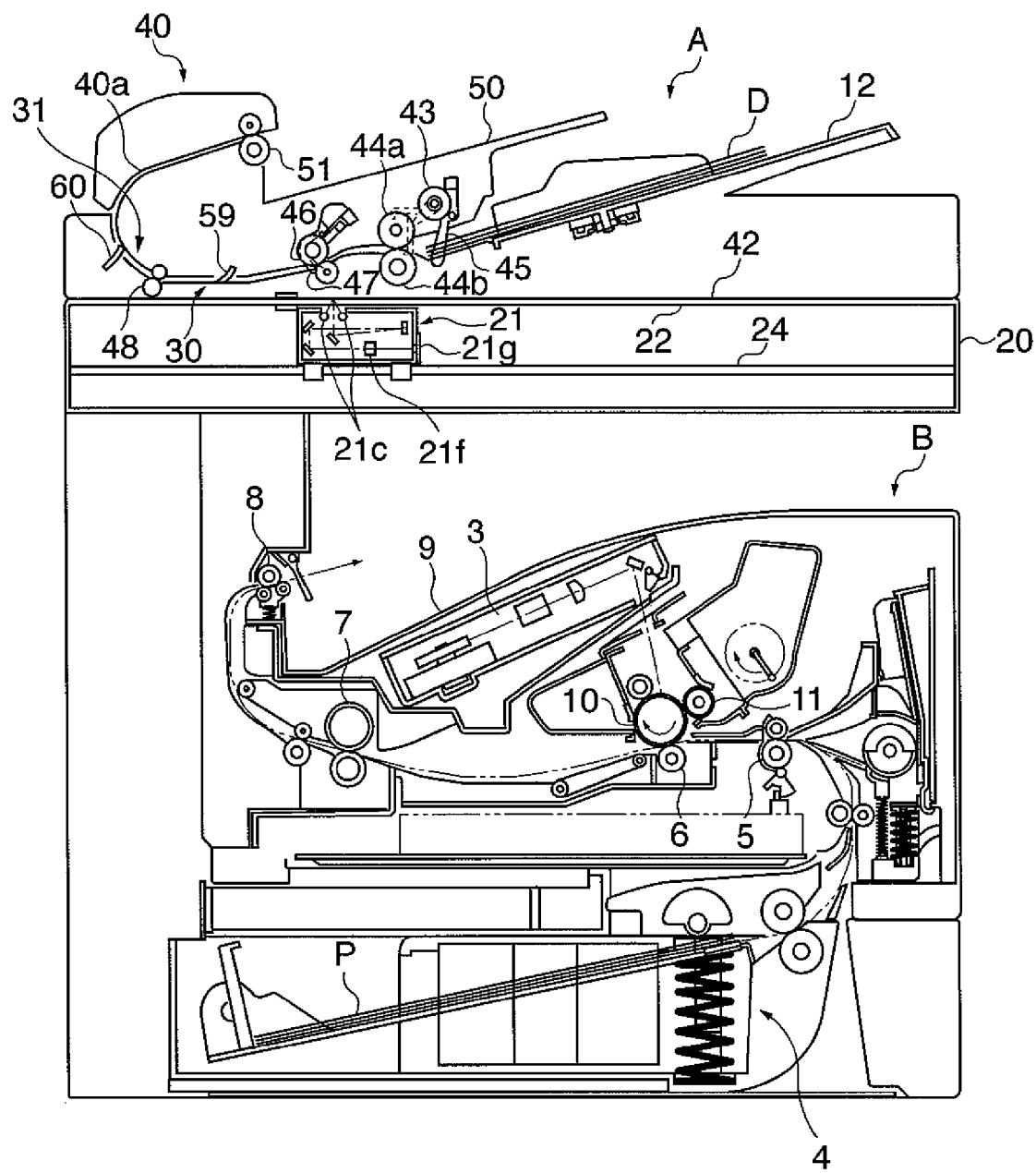
FIG. 1 is a longitudinal sectional view schematically showing the arrangement of an image forming apparatus including an image reading device according to an embodiment of the present invention.

FIG. 1 is a longitudinal sectional view of an image forming apparatus including an image reading device according to an embodiment of the present invention.

As shown in FIG. 1, an image forming apparatus includes an image reading device A that reads image data on an original, and a printing device B that forms the image data read by the image reading device A on a sheet of paper.

The image reading device A is comprised of an auto document feeder (ADF) 40 and a scanning device 20. The ADF 40 has an original tray 12 on which originals D are stacked, and an original detection sensor 45 that detects whether or not the original D is on the original tray 12. The originals D stacked on the original tray 12 are separated one by one by a pick-up roller 43 and a pair of separating rollers 44a, 44b, and pulled into the device. The pulled-in original D is conveyed toward a first reading unit 30 by conveying rollers 46. An original edge sensor 47 that detects an edge of the original D is disposed in the vicinity of the conveyance rollers 46. The detection signal of the original edge sensor 47 is used for detecting paper jamming, for example.

A scanning unit 59 is disposed in the first reading unit 30. The scanning unit 59 reads image data on one side of the original D while the original D passes therethrough. The original D is, after having passed through the first reading unit 30, conveyed toward a second reading unit 31 by conveyance rollers 48. A scanning unit 60 is disposed in the second reading unit 31. The scanning unit 60 reads image data on the other side of the original D while the original D passes therethrough. The first reading unit 30, the second reading unit 31, the scanning unit 59, and the scanning unit 60 will hereinafter be described in detail.

The original D is, after having passed through the second reading unit 31, discharged onto the discharge tray 50 via a U-turn path 40a and the discharge roller 51.

The ADF 40 is hinged to the scanning device 20 openably and closably relative to the scanning device 20. When the ADF 40 is opened, the original D is placed on a platen glass, described hereinafter, of the scanning device 20. The ADF 40 has a white bottom board 42, and the white bottom board 42 is disposed so as to face the platen glass 22 when the ADF 40 is closed. The original D placed on the platen glass 22 closes contacts the platen glass 22 due to the white bottom board 42.

The scanning device 20 includes a scanning unit 21 and the platen glass 22 on which the original D is placed. The scanning unit 21 is disposed below the platen glass 22 so as to move in the sub scanning direction while being guided along a guide rail 24. The scanning unit 21 is provided with a plurality of lamps 21c which illuminate the original D, a line CCD (Charge Coupled Device) 21g, and an optical system 21f that guides the reflected light from the original D illuminated by the respective lamps 21c. The optical system 21f includes a plurality of reflecting mirrors and an imaging lens.

The image reading device A has two modes of an ADF reading mode using the ADF 40 and a fixed original reading mode using the scanning unit 21, in each of which it is possible to read the original D.

In the ADF reading mode, the originals D stacked on the original tray 12 is fed one by one by the ADF 40, and then the fed original D is conveyed to the first reading unit 30, and image data on one side (right surface) of the original D is read by the scanning unit 59. The original D is, after having passed the first reading section 30, conveyed to the second reading unit 31. Then, when a double-sided reading mode is set, the image data on the other side (rear surface) of the original D is read by the scanning unit 60. The original D is, after having passed the second reading section 31, discharged to the discharge tray 50 via the U-turn path 40a and the discharge rollers 51.

On the other hand, in the fixed original reading mode, the ADF 40 is opened and then the original D is placed at a predetermined position on the platen glass 22, and the scanning unit 21 is moved in the sub scanning direction with respect to the placed original D. Namely, the scanning unit 21 is moved in the sub scanning direction while reading the original D on the platen glass 22 in the main scanning direction, to thereby read the whole of the original D.

Figure 5:
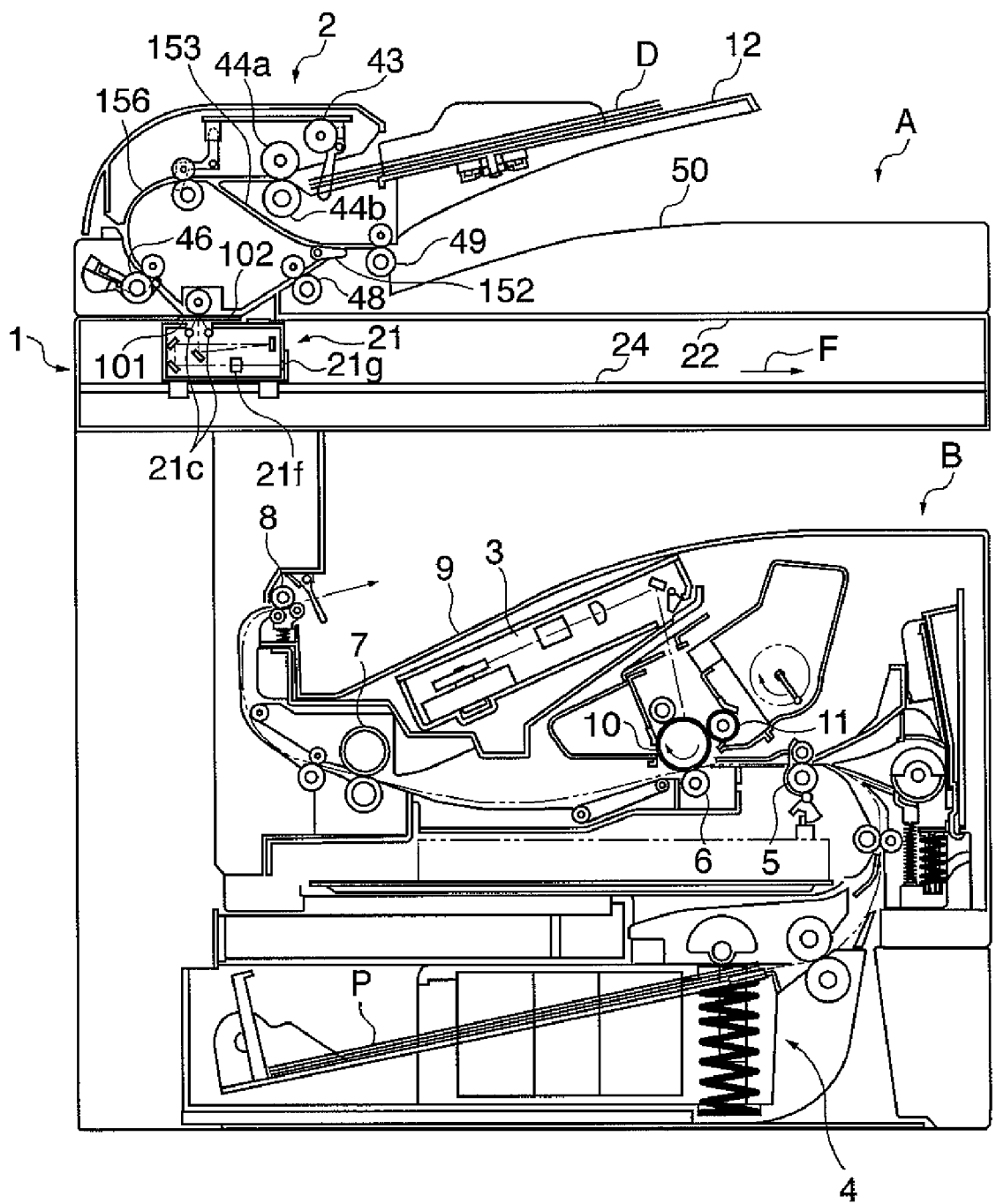
FIG. 5 is a longitudinal sectional view of an image forming apparatus including a conventional image reading device.

A printing device B has the same construction as that of the printing device B in FIG. 5, description of which will be omitted here.

Figure 2:
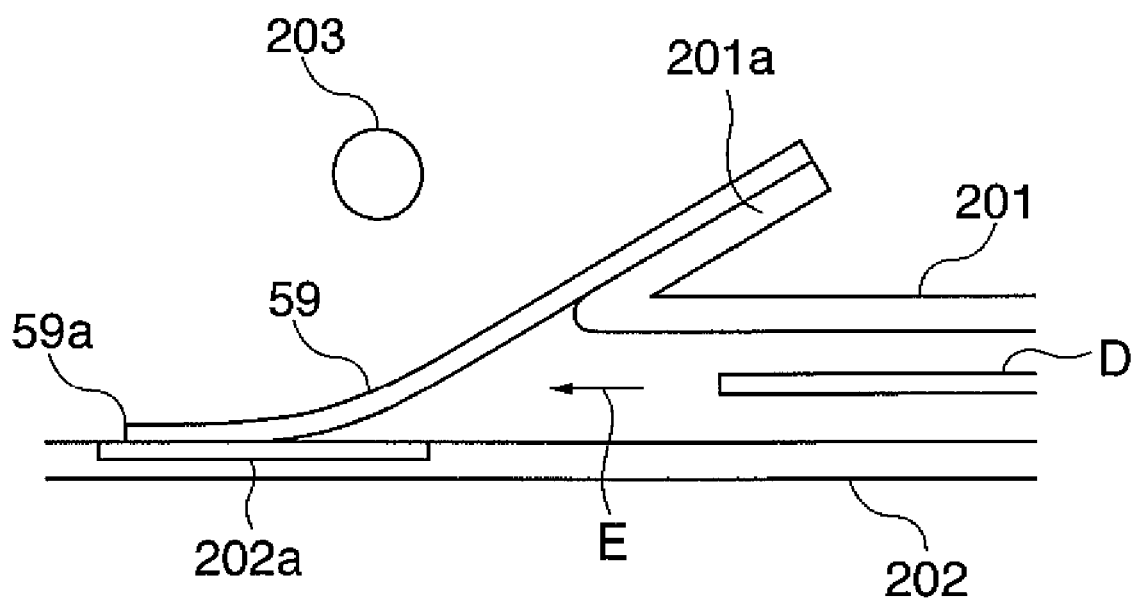
FIG. 2 is a longitudinal sectional view of a first image reading unit in FIG. 1.
Figure 3A:
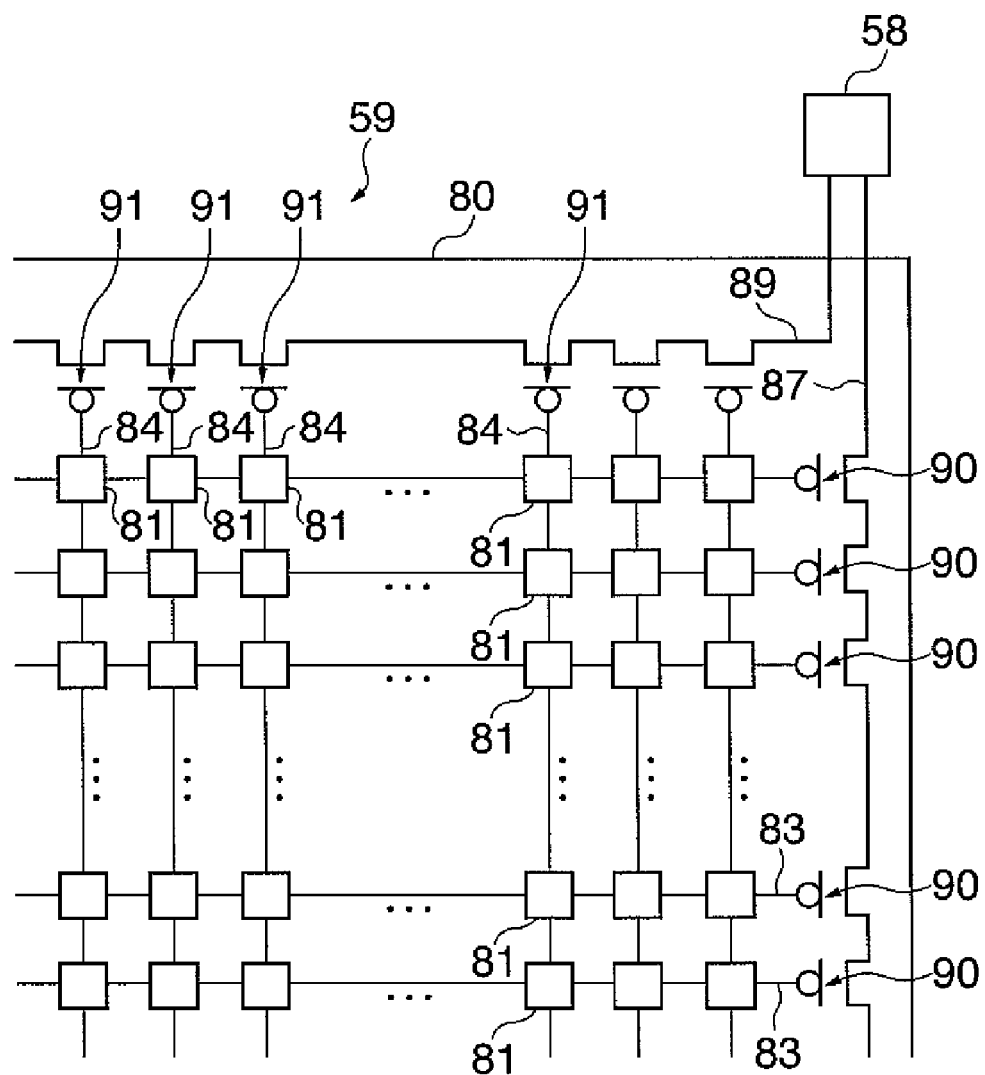
FIG. 3A is a plan view showing a matrix of a plurality of reading pixels arranged on a scanning unit in FIG. 1.

Next, the first reading unit 30 will be described in detail with reference to FIGS. 2 and 3. FIG. 2 is a longitudinal sectional view of the first image reading unit 30 in FIG. 1. FIG. 3A is a plan view showing a matrix of a plurality of reading pixels arranged on a scanning unit in FIG. 1, and FIG. 3B is a block diagram of the reading pixel.

As shown in FIG. 2, the original D fed from the original tray 12 is conveyed to the first reading unit 30 along a conveying path comprised of a pair of guide members 201, 202. The guide members 201, 202 face in parallel each other. An end portion 201a downstream of the guide member 201 is bent obliquely upward so as to form a predetermined angle with the guide member 202. The guide member 202 extends in a conveying direction of the original D indicated by an arrow E, and a reference member 202a for obtaining shading data is disposed on an extension of the end portion 201a of the guide member 201.

The first reading unit 30 has the scanning unit 59. The scanning unit 59 is made of a sheet-like substrate having a rectangular planar shape. This substrate is comprised of a resin-made sheet having optical transparency (including transparency) and flexibility. The scanning unit 59 is fixed to the end portion 201a of the guide member 201 so as to contact the reference member 202a on the guide member 202 at one end 59a thereof. That is, the scanning unit 59 is inclined with respect to the conveying path so as to block the conveying path. The scanning unit 59 (substrate) has flexibility, thereby enabling the original D to push up the one end 59a of the scanning unit 59 and pass through between a reading region section (including the one end 59a) on which the reading pixels of the scanning unit 59 are arranged and the reference member 202a. Then, the reading region section of the scanning unit 59 closely contacts the surface of the original D due to a reaction force by the elastic deformation of the scanning unit 59, and hence the respective reading pixels in the reading region section of the scanning unit 59 read the image data on the surface of the original D.

As shown in FIG. 3A, a plurality of the reading pixels 81 for reading the image data on the original D are arranged in the form of a matrix in the reading region section on the surface of the substrate 80 of the scanning unit 59. Then, the respective reading pixels 81 arranged in the column direction of the matrix are connected to associated word lines 83, and each of the word lines 83 is connected to a column-decoder line 87 via an associated word line selector 90. On the other hand, the respective reading pixels 81 arranged in a row direction of the matrix are connected to associated bit lines 84, and each of the word lines 83 is connected to a line-decoder line 89 via an associated bit line selector 91. The column-decoder line 87 and the line-decoder line 89 are connected to an image processing unit 58. Then, on the rear side of each of the reading pixels 81 is formed a light-shielding film (not shown) for preventing light of a light source 203, described later, from reaching the reading pixels 81 directly. Furthermore, on the surface of the substrate 80 is formed a protection layer (not shown) for protecting the respective reading pixels, and the protection layer has optical transparency.

With this arrangement, it is possible to read out the current value from a certain reading pixel following address designation the column-decoder line 87 and the file-decoder line 89.

Figure 3B:
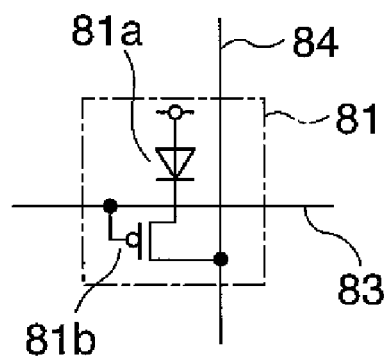
FIG. 3B is a block diagram of the reading pixels.

As shown in FIG. 3B, each of the reading pixels 81 is comprised of an organic photodiode 81a that is operable, when receiving light, to generate an electric current with a value corresponding to the amount of the received light, and an organic transistor 81b. The value of electric current generated by the organic photodiode 81a is read out by switching the organic transistor 81b. The organic photodiode 81a and the organic transistor 81b are made of organic semiconductors.

Each of the reading pixels is thus comprised of an organic semiconductor, and therefore, the use of a precision printing technique, for example, enables a plurality of the reading pixels 81 and peripheral circuits to be formed on the substrate 80.

In this embodiment, a plurality of the reading pixels 81 are arranged in the form of a matrix; however, in place of this, the reading pixels 81 can be arranged in a single line perpendicularly to the conveying direction of the original D.

As shown in FIG. 2, a light source 203 is disposed on a rear side of the scanning unit 59. The light emitted by the light source 203 transmits through between the respective reading pixels 81 in the scanning unit 59, and illuminates the original D or the reference member 202a.

In the second reading unit 31, the scanning unit 60 is arranged so as to read the image data on the rear surface of the original D. As is the case with the scanning unit 50, the scanning unit 60 is comprised of a substrate on which a plurality of reading pixels are arranged in the form of a matrix. The support structure (not shown) of the scanning unit 60 is constructed in the same way as that of the scanning unit 59 in the first reading unit 30, and a reference member (not shown) and a light source (not shown) are provided.

The original D passes the second reading unit 31 through between the reading region section (on which the reading pixels are arranged) in the scanning unit 60 and the reference member. Then, the rear side of the original D has closely contacts the reading region section in the scanning unit 60, and the image data on the rear side of the original D is read out by the respective reading pixels in the reading region section of the scanning unit 60.

Next, a circuit configuration of the image processing section will be described with reference to FIG. 4. FIG. 4 is a block diagram of a circuit configuration of an image processing section 58 in FIG. 3A.

As shown in FIG. 4, the image processing unit 58 includes an A/D converter that converts an image signal outputted from each of the scanning units 59, 60. The digital image signal outputted from the A/D converter 501 is inputted to a shading correction circuit 502. The shading correction circuit 502 performs shading correction to inputted digital signal. The image signal having undergone the shading correction is inputted to an image processing circuit 503. The image processing circuit 503 carries out a predetermined image processing to the inputted image signal, and delivers the image signal as image data to the printing device B via an I/F circuit 504.

Next, the ADF reading mode according to this embodiment will now be described.

When the original D is read out in the ADF reading mode, the ADF reading mode is selected by a user. Either a single-side reading mode of reading a single side of the original or a double-sided reading mode of reading double sides of the original is selected. Then, one or more sheet(s) of the original D to be read out is (are) stacked on the original tray 12 in the ADF 40.

Next, when a reading start instruction is given by a user, the light source 203 is lit on at the first reading unit 30, and the reference member 202a is illuminated. Electric signals (image signal) are read out from the respective reading pixels 81 disposed in the region closely contacting the reference member 202a in the scanning unit 59. The read electric signals are inputted to the image processing unit 58. The image processing unit 58 converts the inputted electric signals into digital signals, which are stored in a memory (not shown) as shading data. Furthermore, when the double-sided reading mode is selected, the second reading unit 31 obtains the shading data, as is the case with the first reading unit 30.

After the shading data is obtained, the ADF 40 starts feeding the originals D stacked on the original tray 12. Then, the fed original D is conveyed to the first reading unit 30. The original D conveyed to the first reading unit 30 pushes up the end portion of the scanning unit 59, and passes through between the reading region section (including the end portion 59a) of the scanning unit 59 and the reference member 202a. Then, the surface of the original D closely contacts the reading region section of the scanning unit 59, and the image data on the rear side of the original D is read out by the respective reading pixels 81 in the reading region section of the scanning unit 59. The image signals read by the respective reading pixels 81 are delivered to the printing unit B as image data after having undergone various processings such as a shading correction processing based on the obtained shading data at the image processing section 58.

The original D is, after having passed the first reading section 30, conveyed to the second reading unit 31. The original D conveyed to the second reading unit 32 pushes up the end portion of the scanning unit 60, and passes through between the reading region section of the scanning unit 60 and the reference member. When the double-sided reading mode is selected, the image data on the rear side of the original D is read out by the respective reading pixels in the reading region section of the scanning unit 60 closely contacts the rear side of the original D. The image signals read by the respective reading pixels are delivered to the printing unit B as image data after having undergone various processings such as a shading correction processing based on the obtained shading data at the image processing unit 58.

The original D is, after having passed through the second reading section 31, discharged to the discharge tray 50 via the U-turn path 40a by the discharge roller 51.

Thus, according to this embodiment, it is capable of reading out the image data on the original D while conveying the original in a simple construction.

Specifically, since each of the scanning units 59, 60 has flexibility, the reading region sections of the scanning units 59, 60 closely contact the original D when reading out the image data on the original D, thereby eliminating the need for preparing a pressurizing unit for causing the original D to closely contact the scanning units 59, 60.

Further, the image data on both the right and rear sides of the original D can be read respectively by the two scanning units 59, 60, thereby eliminating the need for preparing an original inverting mechanism, an inverse conveying mechanism and the like, which realizes cost-reduction and miniaturization of the image reading device A. Furthermore, it is possible to improve the productivity by reducing the time needed for reading both sides of the original D.

The respective reading pixels of the scanning units 59, 60 are made of organic semiconductors, thereby making a method of producing each of the scanning units easy compared with an optical sensor using an inorganic semiconductor such as a CCD, which reduces the production cost per unit area.

In this embodiment, the scanning device 20 is provided so as to realize the fixed original reading mode; however, it is possible to construct an image reading device devoid of the scanning device 20. In this case, it is possible to realize, at a low cost, a simplified image reading device provided with one or more scanning unit(s) 59, 60, and a conveying unit that conveys the original D.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims the benefit of Japanese Patent Application No. 2005-376413 filed Dec. 27, 2005, which is hereby incorporated by reference herein in its entirety.

What is claimed is:

1. An image reading device comprising:
  a conveying path that has a pair of guide members facing each other at a distance and extending in a conveying direction of an original;
  an original conveying unit that conveys the original along the conveying path; and
  an image reading unit that is comprised of a flexible sheet-like substrate on which a plurality of optical sensors are arranged,
  wherein the sheet-like substrate is inclined with respect to the conveying direction of the original, and fixed to one of the pair of guide members at one end thereof and abuts against the other of the pair of guide members at the other end thereof,
  wherein said image reading unit reads image data on one side of the original when the original is conveyed along the conveying path and passes through between the other end of the sheet-like substrate and the other of the pair of guide members, and
  wherein the original displaces the other end the sheet-like substrate and causes the sheet-like substrate to deform when the original passes through between the other end of the sheet-like substrate and the other of the pair of guide members, wherein the other of the pair of guide members has a reference member for obtaining shading data in the portion against which an end of the sheet-like substrate abuts, wherein the portion is an extension of an end portion of the one of the pair of guide members.

2. An image reading device as claimed in claim 1, wherein said image reading unit is comprised of another flexible sheet-like substrate on which a plurality of optical sensors are arranged,
  wherein the another sheet-like substrate is inclined with respect to the conveying direction of the original, and fixed to the other of the pair of guide members at one end thereof and abuts against the one of the pair of guide members at the other end thereof, and wherein said image reading unit reads out image data on the other side of the original when the original is conveyed along the conveying path and passes through between the other end of the another sheet-like substrate and the one of the pair of guide members.

3. An image reading device as claimed in claim 1, wherein the plurality of optical sensors are arranged on the sheet-like substrate in the form of a matrix.

4. An image reading device as claimed in claim 3, wherein the plurality of optical sensors are in the form of an arrangement pattern in which the respective optical sensors are arranged along the conveying direction of the original and a direction perpendicular to the conveying direction of the original, respectively.

5. An image reading device as claimed in claim 1, wherein the sheet-like substrate is optically transparent, and a light source for illuminating the original via the substrate is arranged on the side of the sheet-like substrate where the optical sensors are located.

6. An image forming apparatus comprising:

an image reading device including: a conveying path that has a pair of guide members facing each other at a distance and extending in a conveying direction of an original; an original conveying unit that conveys the original along the conveying path; and an image reading unit that is comprised of a flexible sheet-like substrate on which a plurality of optical sensors are arranged;

a printing device that forms the image data read by the image reading device on print medium;

wherein the sheet-like substrate is inclined with respect to the conveying direction of the original, and fixed to one of the pair of guide members at one end thereof and abuts against the other of the pair of guide members at the other end thereof;

wherein said image reading unit reads image data on one side of the original when the original is conveyed along the conveying path and passes through between the other end of the sheet-like substrate and the other of the pair of guide members; and wherein the original displaces the other end the sheet-like substrate and causes the sheet-like substrate to deform when the original passes through between the other end of the sheet-like substrate and the other of the pair of guide members, wherein the other of the pair of guide members has a reference member for obtaining shading data in the portion against which an end of the sheet-like substrate abuts, wherein the portion is an extension of an end portion of the one of the pair of guide members.

7. An image forming apparatus as claimed in claim 6, wherein said image reading unit is comprised of another flexible sheet-like substrate on which a plurality of optical sensors are arranged, wherein the another sheet-like substrate is inclined with respect to the conveying direction of the original, and fixed to the other of the pair of guide members at one end thereof and abuts against the one of the pair of guide members at the other end thereof, and wherein said image reading unit reads out image data on the other side of the original when the original is conveyed along the conveying path and passes through between the other end of the another sheet-like substrate and the one of the pair of guide members.

8. An image forming apparatus as claimed in claim 6, wherein the plurality of optical sensors are arranged on the sheet-like substrate in the form of a matrix.

9. An image forming apparatus as claimed in claim 8, wherein the plurality of optical sensors are in the form of an arrangement pattern in which the respective optical sensors are arranged along the conveying direction of the original and a direction perpendicular to the conveying direction of the original, respectively.

10. An image forming apparatus as claimed in claim 6, wherein the other of the pair of guide members has a reference member for obtaining shading data in the portion against which an end of the sheet-like substrate abuts.

11. An image reading device as claimed in claim 6, wherein the sheet-like substrate is optically transparent, and a light source for illuminating the original via the substrate is arranged on the side of the sheet-like substrate where the optical sensors are located.

* * * * *

UNITED STATES PATENT AND TRADEMARK OFFICE
CERTIFICATE OF CORRECTION

PATENT NO. : 7,787,161 B2  Page 1 of 1
APPLICATION NO. : 11/612944
DATED : August 31, 2010
INVENTOR(S) : Oyama It is certified that error appears in the above-identified patent and that said Letters Patent is hereby corrected as shown below:

On the Title Page Item (75) Inventor Field: Inventors residence should be changed as follows:

REMOVE: TOKYO

INSERT --SHINJUKU-KU--

Signed and Sealed this

Twenty-sixth Day of October, 2010

David J. Kappos
*Director of the United States Patent and Trademark Office*